(12) United States Patent
Jiang et al.

(10) Patent No.: US 12,470,148 B2
(45) Date of Patent: Nov. 11, 2025

(54) TRANS-INDUCTOR VOLTAGE REGULATOR FOR HIGH BANDWIDTH POWER DELIVERY

(71) Applicant: Google LLC, Mountain View, CA (US)

(72) Inventors: Shuai Jiang, San Jose, CA (US); Xin Li, Cupertino, CA (US); Woon-Seong Kwon, Santa Clara, CA (US); Cheng Chung Yang, New Taipei (TW); Qiong Wang, Palo Alto, CA (US); Nam Hoon Kim, San Jose, CA (US); Mikhail Popovich, Danville, CA (US); Houle Gan, Santa Clara, CA (US); Chenhao Nan, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 141 days.

(21) Appl. No.: 17/961,264

(22) Filed: Oct. 6, 2022

(65) Prior Publication Data

US 2024/0120847 A1   Apr. 11, 2024

(51) Int. Cl.
*H02M 3/335* (2006.01)
*H02M 1/00* (2006.01)

(52) U.S. Cl.
CPC ..... *H02M 3/33576* (2013.01); *H02M 1/0067* (2021.05); *H02M 3/33571* (2021.05)

(58) Field of Classification Search
CPC .......... H02M 3/003; H02M 3/02; H02M 3/04; H02M 3/135; H02M 3/137; H02M 3/139; H02M 3/155; H02M 3/1552; H02M 3/156; H02M 3/1566; H02M 3/157; H02M 3/158; H02M 3/1584; H02M 3/1586; H02M 3/1588; H02M 3/22; H02M 3/24; H02M 3/28; H02M 3/285; H02M 3/315; H02M 3/335; H02M 3/33507; H02M 3/33515; H02M 3/33523; H02M 3/3353; H02M 3/33538; H02M 3/33546; H02M 3/33553;
(Continued)

(56) References Cited

U.S. PATENT DOCUMENTS 6,897,641 B1    5/2005  Herbert
7,251,113 B1 *  7/2007  Batarseh .............. H02M 3/158
                                                  361/111
(Continued)

FOREIGN PATENT DOCUMENTS

JP          2013046431 A        3/2013

OTHER PUBLICATIONS

Extended European search report for European Appl. No. 23174212.3 dated Feb. 27, 2024. 10 pages.

*Primary Examiner* — Thienvu V Tran
*Assistant Examiner* — Carlos O Rivera-Perez
(74) *Attorney, Agent, or Firm* — Lerner David LLP

(57) ABSTRACT

A voltage regulator having a multiple of main stages and at least one accelerated voltage regulator (AVR) bridge is provided. The main stages may respond to low frequency current transients and provide DC output voltage regulation. The AVR bridges are switched much faster than the main stages and respond to high frequency current transients without regulating the DC output voltage. The AVR bridge frequency response range can overlap with the main stage frequency response range, and the lowest frequency to which the AVR bridges respond may be set lower than the highest frequency to which the main stages respond.

18 Claims, 8 Drawing Sheets

(58) Field of Classification Search
CPC ......... H02M 3/33561; H02M 3/33569; H02M 3/33571; H02M 3/33573; H02M 3/33576; H02M 3/33584; H02M 3/33592; H02M 1/0043; H02M 1/0064; H02M 1/0067; H02M 1/007; H02M 1/0074; H02M 1/0095; H02J 3/00; H02J 3/38
USPC .. 363/15–21.18, 64, 65, 101, 123, 131–134; 323/212, 215–219, 222–226, 247, 251, 323/252, 266, 271–275, 282–287, 311, 323/312, 351; 361/111
See application file for complete search history.

(56) References Cited

U.S. PATENT DOCUMENTS

2017/0207723 A1\* 7/2017 Zhang .................... H02M 1/12
2021/0119538 A1 4/2021 Leong et al.

\* cited by examiner

TRANS-INDUCTOR VOLTAGE REGULATOR FOR HIGH BANDWIDTH POWER DELIVERY

BACKGROUND

Multiphase buck voltage regulators are widely used for today's xPU power deliveries in data centers. A multiphase voltage regulator (VR), such as a multiphase trans-inductor voltage regulator (TLVR), typically converts from a roughly regulated high input voltage (e.g., 5-12V) to a finely regulated low output voltage (e.g., 1.2V, 1V, 0.8V). In order to achieve high power conversion efficiency (e.g., 85%-90%) at high current demand (hundreds to thousands of Amps) of xPUs (e.g., ASICs, application-specific integrated circuits), these VRs are switching at relatively low frequencies (under a couple of MHz) with limited control bandwidths.

Typical multiphase VRs (non-TLVRs) usually require a large amount of output decoupling capacitors across the system motherboard, xPU chip package and xPU chip die. TLVRs, which reduce the equivalent output inductance significantly, are able to deliver much higher transient performance than traditional multiphase VRs, thereby reducing the need for motherboard decoupling capacitance. Nevertheless, the transient performance improvement of TLVRs is still limited by the switching frequency and control bandwidth such that the decoupling capacitors on the motherboard may not be completely removed.

In any event, decoupling capacitors farthest from the chip die have the highest amount of capacitance with the largest ESLs, while the capacitors closest to the chip die have the lowest amount of capacitance with the smallest ESLs (equivalent series inductances). These decoupling capacitors along with the system parasitic L (inductance) and R (resistance) form the complex PDN network. They address the voltage transient noises across a wide range of frequencies (from hundreds of kHz to hundreds of MHz).

However, because of all the parasitic L and R within the PDN network, multiple peaks formed by LC resonance would appear in the PDN output impedance seen by the chip. Normally, the resonance formed by the package L and on-die capacitance is called "1st resonance." And the transient voltage droop caused by this resonance is called "1st droop." Likewise, the resonance formed by the board parasitic L and package capacitance is called "2nd resonance." And the transient voltage droop caused by the 2nd resonance is called "2nd droop." In modern xPU power delivery systems, the transient voltage droop or noise is often dictated by the 1st droop or 2nd droop. A large voltage droop seen by the chip often results in a loss of chip performance (measured by its max clock frequency Fmax), or extra power consumption due to the increased supply voltage necessary to absorb transient noises. In order to mitigate the 1st droop problem, some advanced on-die decoupling capacitor technologies such as high density MiM (metal-insulator-metal), deep-trench-capacitor (DTC) are being widely adopted. These decoupling cap technologies are very effective in suppressing the 1st resonance of PDN impedance. There are other on-die power management techniques such as di/dt detection, clock skipping, frequency-lock-loop being used to mitigate the di/dt impact. In order to mitigate the 2nd droop problem, using more high-density package capacitors is preferred. However, the 2nd resonance of PDN impedance is still constrained by a variety of system design physical limitations.

Some high bandwidth VR technologies have been proposed and adopted in the industry to mitigate the 2nd droop problem. The most commonly used high bandwidth VRs are based on IVR (integrated voltage regulator) technology. An IVR usually employs a multiphase buck VR topology fabricated in an advanced silicon technology node that enables very high switching frequency (>50 MHz) and bandwidth. In this case, the IVR only requires package and on-die capacitors for output decoupling. And it can often reduce 2nd droop by tens of mV. The IVR buck VRs sometimes also leverage advanced on-chip inductor technologies that can be integrated with the buck power stages. These IVR technologies usually require low input voltages such as 1.6V~2V due to technology process constraints. Also, the end-to-end power delivery efficiency is often much lower than standard multiphase VR technologies.

BRIEF SUMMARY

It has been recognized that elements of a TLVR can be combined with high bandwidth VR technologies to realize a VR having good transient response and high end-to-end power delivery efficiency.

In view of the desire for a VR having good transient response and high end-to-end power delivery efficiency, the presently disclosed technology is provided.

In one aspect, the technology provides a voltage regulator including a plurality of main stages, each main stage having first switching circuitry, a primary winding, and a secondary winding inductively coupled to the primary winding, the first switching circuitry configured to selectively couple a main input voltage to the secondary winding at a main stage switching frequency, and the secondary winding coupled between the switching circuitry and an output terminal, wherein the primary windings of the main stages are connected in series to form a series connection having a first end and a second end; and at least one accelerated voltage regulator (AVR) bridge having second switching circuitry, each AVR bridge coupled to one of the first end or the second end of the series connection, and the second switching circuitry configured to selectively couple an AVR bridge input voltage to the series connection at an AVR bridge switching frequency, wherein the AVR bridge switching frequency is at least ten times greater than the main stage switching frequency.

In another aspect, the technology provides a voltage regulator including a plurality of main stages, each main stage having first switching circuitry, a main stage primary winding, and a main stage secondary winding inductively coupled to the main stage primary winding, the first switching circuitry configured to selectively couple a main input voltage to the main stage secondary winding at a main stage switching frequency, and the main stage secondary winding coupled between the first switching circuitry and an output terminal; and at least one accelerated voltage regulator (AVR) bridge, each AVR bridge having second switching circuitry, and being coupled to an AVR bridge secondary winding which is inductively coupled to an AVR bridge primary winding, the second switching circuitry configured to selectively couple an AVR bridge input voltage to the AVR bridge secondary winding at an AVR bridge switching frequency, and the AVR bridge secondary winding being coupled between the second switching circuitry and the output terminal or between a first one of the at least one AVR bridge and a second one of the at least one AVR bridge, wherein the main stage primary windings and the AVR bridge primary winding are connected in series to form a series connection having a first end and a second end, and wherein the AVR bridge switching frequency is at least ten times greater than the main stage switching frequency.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Figure 1:
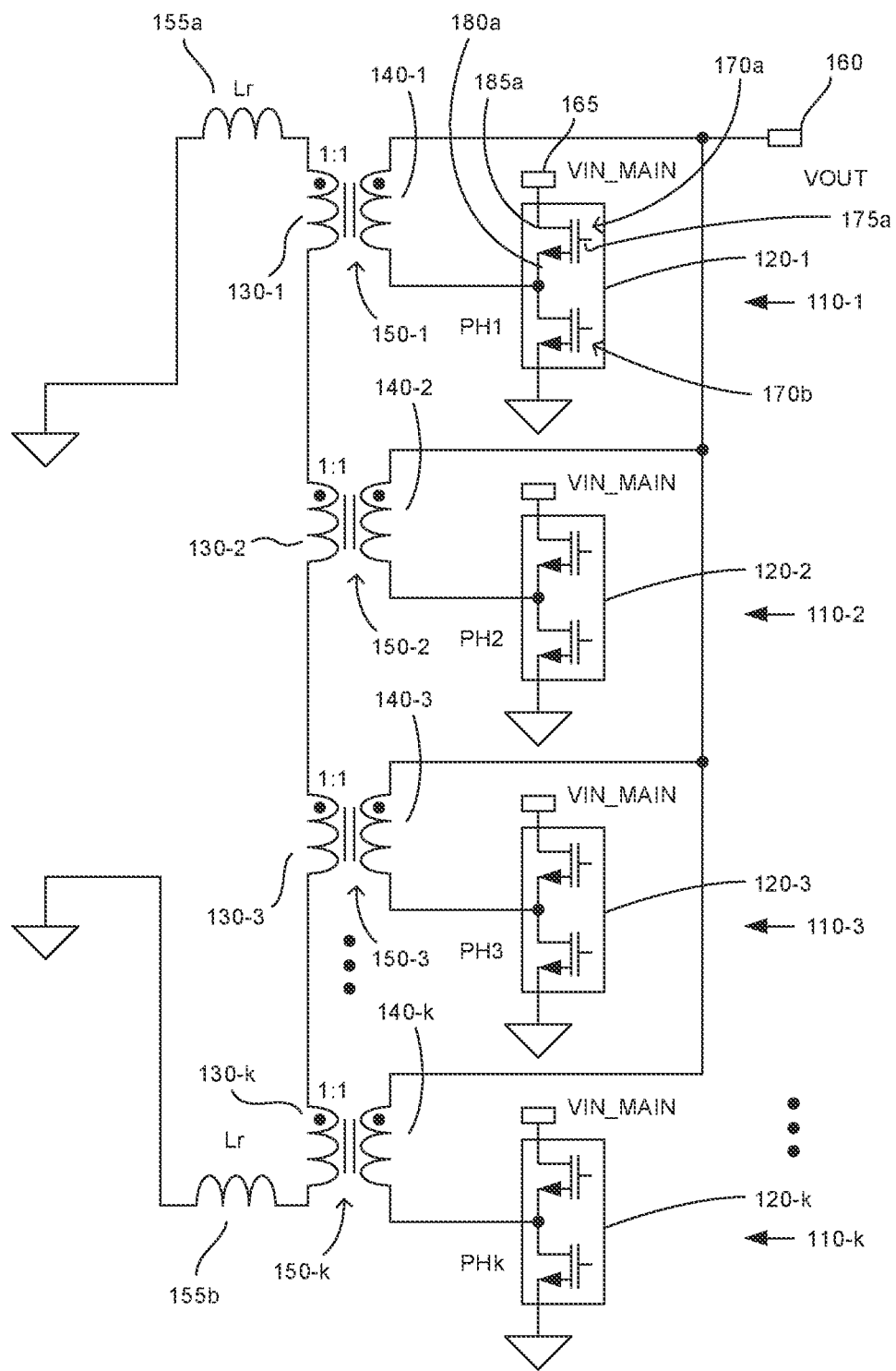
FIG. 1 is a circuit diagram of a trans-inductor voltage regulator (TLVR) which may serve as a base structure of an embodiment.

Examples of systems and methods are described herein. It should be understood that the words "example," "exemplary" and "illustrative" are used herein to mean "serving as an example, instance, or illustration." Any embodiment or feature described herein as being an "example," "exemplary" or "illustration" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

A voltage regulator having a multiple of main stages and at least one accelerated voltage regulator (AVR) bridge is provided. The main stages may respond to low frequency current transients and provide DC output voltage regulation. The AVR bridges are switched much faster than the main stages and respond to high frequency current transients without regulating the DC output voltage. The AVR bridge frequency response range can overlap with the main stage frequency response range, and the lowest frequency to which the AVR bridges respond may be set lower than the highest frequency to which the main stages respond.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure describes a trans-inductor voltage regulator that is a hybrid multiphase VR topology which combines low-frequency buck power stages with high-frequency accelerated voltage regulator (AVR) bridges through a transformer-inductor coupling structure. The low frequency buck phases are controlled in a low-bandwidth manner that only regulates the output voltage at low frequency and DC. While the high-frequency AVR bridges are controlled in a high-bandwidth high-pass manner that only regulates the output transient AC voltage beyond a certain frequency. At steady state, the AVR bridges can be controlled with very small or even 0 A DC bias current so that the voltage regulator power loss can be minimized. During transients, the AVR bridges adjust their duty cycles very fast to ramp up/down the current circulating in the regulator's primary side windings. Because of the very small leakage inductance of the primary-side/secondary-side couplings, the AVR bridges can have the capability to drive the primary current with very fast di/dt (i.e., transient response). And this fast current on the primary side will be reflected to the secondary side with an amplification factor equal to the transformer conversion ratio. For example, in a presently disclosed VR with 8 standard main phases and 1:1 turns ratio trans inductor for each phase, the transformer conversion ratio equals to 8:1 such that the primary current can be amplified by 8 times. The entire topology adds only very small AVR bridges that are provisioned for a small fraction of the total peak power. In the meantime, the fast transient performance at the VR output can be achieved. As a result, the VR realizes IVR-class transient response with high efficiency, e.g., nearly equivalent to the standard multiphase VR technologies. With a presently disclosed VR, onboard decoupling capacitors may be completely removed.

FIG. 1 is a circuit diagram of a trans-inductor voltage regulator (TLVR) 100 that may be combined with AVR bridges to realize an embodiment. As can be seen from the figure, the TLVR 100 includes a multiple ("k") of main stages (or "phases") 110-1, 110-2, 110-3 ... 110-k. The main stages 110-1 to 110-k include respective switching circuitry 120-1, 120-2 ... 120-k, respective primary windings 130-1, 130-2, 130-3 ... 130-k, and respective secondary windings 140-1, 140-2, 140-3 ... 140-k inductively coupled to the primary winding 130-1, 130-2, 130-3 ... 130-k. The primary windings 130-1 to 130-k are connected in series and may be inductively coupled to the secondary windings 140-1 to 140-k by one or more transformer cores. In the configuration depicted in FIG. 1, the primary windings 130-1 to 130-k are respectively coupled to the secondary windings 140-1 to 140-k by transformer cores 150-1, 150-2, 150-3 ... 150-k. Further, the respective inductive couplings between primary windings 130-1 to 130k and secondary windings 140-1 to 140-k are imperfect, having associated inductive leakages, which are lumped for equivalent circuit purposes into a first leakage inductance 155a between primary winding 130-1 and ground, and a second leakage inductance 155b between primary winding 130k and ground.

The voltage regulator 100 may be operated to regulate the voltage at an output terminal 160. In such operation, each of main stages 110-1 to 110k are periodically activated to couple a main input voltage 165 to the output terminal 160 through the respective secondary winding 140-1 to 140k. Only one of the main stages 110-1 to 110k is activated at a time and the activation times are evenly spaced from each other, with the activation time for a given main stage being determined by a pulse width modulated (pwm) waveform. To illustrate, the operation of main stage 110-1 is described in more detail. The other main stages 110-2 to 110-k are similarly configured and therefore their operation can be understood in view of the description of main stage 110-1.

As can be seen from FIG. 1, the switching circuitry 120-1 of main stage 110-1 may include a first switch 170a and a second switch 170b. To activate main stage 110-1, the first switch 170a is turned on and the second switch 170b is turned off, thereby coupling the main input voltage 165 to the output terminal 160 through secondary winding 140-1 and generating an increasing flow of current through secondary winding 140-1. The current in secondary winding 140-1 continues to increase until the main stage 110-1 is deactivated, i.e., when the first switch 170a is turned off and the second switch 170b is turned on. When main stage 110-1 is deactivated, the current through secondary winding 140-1 begins to decay. Thus, by controlling the switches 170a and 170b the current supplied by main stage 110-1 can be controlled. Such switch control may be performed by turning the switches 170a and 170b on and off in response to pwm control signals. For example, switch 170a may be a metal-oxide-semiconductor field-effect transistor (MOSFET) having a gate terminal 175a, a source terminal 180a, and a drain terminal 185a, and a pwm control signal may be provided to the gate terminal 175a to control the on/off state between the source terminal 180a and the drain terminal 185a. Similarly, switch 170b may take the form of a MOSFET and be controlled through a pwm control signal. In practice, the pwm signals controlling the switches 170a and 170b may be the inverse of each other, and they may be provided by control circuitry (not shown) in response to current demanded by a load coupled to the output terminal 160. That is, when an increased demand for current at output terminal 160 is sensed by the control circuitry, the control circuitry may modulate the duty cycle of the pwm control signals for switches 170a and 170b such that stage 110-1 stays active longer and supplies more current to the load. The other stages 110-2 to 110-k may be similarly controlled. In this manner, the voltage regulator 100 may be controlled to respond to load transients.

Nevertheless, the speed at which voltage regulator 100 responds to transients can be improved by adding one or more AVR bridges to the regulator. The AVR bridges may include switches that enable very high switching frequency, such as >20 MHz, and may operate at low input voltages, such as 1.6V~3.3V. Moreover, the AVR bridges can be implemented by a field-effect transistor (FET) technology process more advanced than used for the main stages 110-1, 110-2, 110-3 . . . 110-k, thereby allowing the AVR bridges to have much faster switching speed and control bandwidth than the main stages 110-1 to 110-k. Thus, the AVR bridges may be configured to exhibit IVR class transient response.

Figure 2:
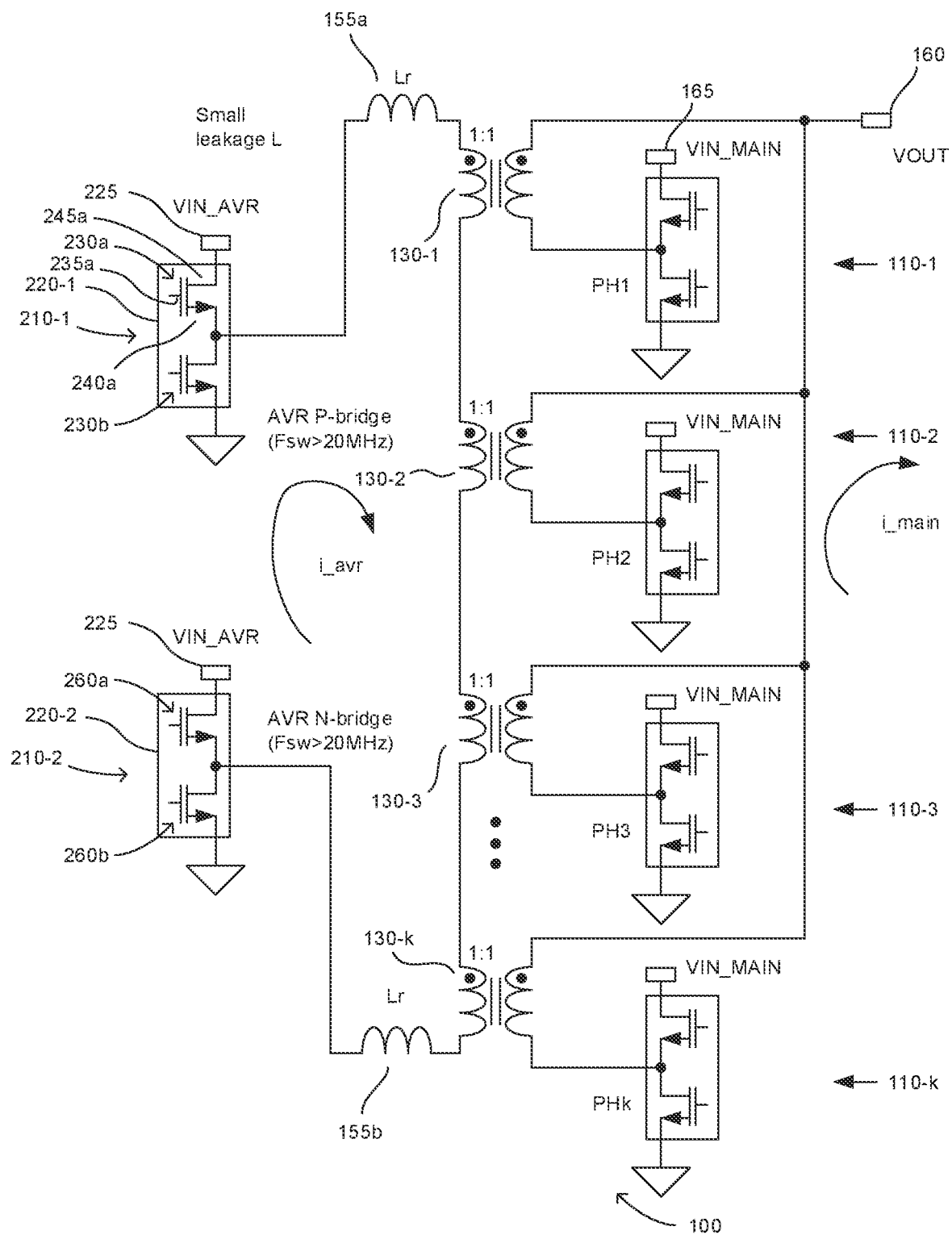
FIG. 2 is a circuit diagram of a voltage regulator of an embodiment having two accelerated voltage regulator (AVR) bridges coupled to the primary windings of the TLVR of FIG. 1.

FIG. 2 is a circuit diagram of a voltage regulator 200 of an embodiment employing two AVR bridges coupled to the primary windings 130-1 to 130-k of the TLVR 100 of FIG. 1. A first AVR bridge 210-1 is coupled to the primary winding 130-1, and a second AVR bridge 210-2 is coupled to the primary winding 130k. The first AVR bridge 210-1 is denoted as a P-bridge (or "positive bridge") as, when activated, it supplies current in the direction indicated by arrow i_avr. Conversely, the second AVR bridge 210-2 may be denoted as an N-bridge (or "negative bridge") as, when activated, it supplies current in the direction opposite that indicated by arrow i_avr. The currents supplied by the AVR bridges 210-1 and 210-2 are reflected to the output terminal 160 at a ratio of k:1. Accordingly, very small AVR currents can be used to add or subtract significant current from that provided at output terminal 160.

The AVR bridges 210-1 and 210-2 include respective switching circuitry 220-1 and 220-2 for selectively coupling an AVR bridge input voltage 225 to the primary windings 130-1 to 130-k. To describe AVR bridges 210-1 and 210-2 in more detail, AVR bridge 210-1 is considered. The operation of AVR bridge 210-2 will be readily understood in view of the more detailed description of AVR bridge 210-1 since AVR bridges 210-1 and 210-2 are similarly configured.

As can be seen from FIG. 2, the switching circuitry 220-1 of AVR bridge 210-1 may include a first switch 230a and a second switch 230b. To switch on AVR bridge 210-1, the first switch 230a is turned on and the second switch 230b is turned off, thereby coupling the AVR bridge input voltage 225 to the primary winding 130-1. In this manner, an increasing flow of current is generated through each of primary windings 130-1 to 130k in the direction indicated by the arrow i_avr. The increasing flow of current through the primary windings 130-1 to 130k is, in turn, respectively reflected to the secondary windings 140-1 to 140-k through transformer cores 150-1 to 150-k. The result is increasing current at the output terminal 160, with a magnitude that is k:1 times the current supplied by AVR bridge 210-1 to the primary windings 130-1 to 130-k. The current at the output terminal 160 caused by switching on of AVR bridge 210-1 continues to increase until the AVR bridge 210-1 is switched off, i.e., when the first switch 230a is turned off and the second switch 230b is turned on.

By similar operation, the current provided at output terminal 160 may be decreased by switching on AVR bridge 210-2. For example, AVR 210-2 may include a first switch 260a and a second switch 260b configured and operated like switches 230a and 230b of AVR 210-1. Further, by switching the AVR bridges 210-1 and 210-2 between on and off at times equal and opposite to each other, the DC component of the current generated in the primary windings 130-1 to 130-k by AVR bridges 210-1 and 210-2 can be maintained at 0 A to maximize power efficiency. Alternatively, the AVR bridges 210-1 and 210-2 may be controlled so that the DC component of the current generated in the primary windings 130-1 to 130-k by AVR bridges 210-1 and 210-2 is maintained at a value other than 0 A.

The AVR bridges 210-1 and 210-2 may each be switched between on and off states according to a duty cycle. Thus, when the current demanded by a load coupled to output terminal 160 suddenly increases, the duty cycle of the AVR bridge 210-1 is increased and the duty cycle of the AVR bridge 210-2 is decreased, such that a net increased current flow appears in the primary winding, for reflection into the output terminal 160 at a ratio of k:1. The increased current flow through AVR operation continues until the main stages have fully responded to the sudden increase in the demanded current. After the main stages have responded, the AVR bridges 210-1 and 210-2 return to their steady state operation, in which they are turned on and off at a 50% duty cycle such that the DC component of the current generated in the primary windings 130-1 to 130-k by AVR bridges 210-1 and 210-2 can stay low or at zero to maximize power efficiency.

The AVR bridges 210-1 and 210-2 are operated at a 50% duty cycle in the steady state to allow them to quickly respond to small departures from the ideal steady state. That is, the practical steady state is not the ideal steady state, and thus as a practical matter the duty cycles of AVR bridges 210-1 and 210-2 are always being slightly adjusted around 50%.

Switching of AVR bridges 210-1 and 210-2 may be controlled in a manner similar to that by which activation of main stages 110-1 to 110k are controlled. For example, AVR bridge 210-1 may be controlled by turning the switches 230a and 230b on and off in response to pwm control signals. In one possible embodiment, switch 230a may be a metal-oxide-semiconductor field-effect transistor (MOSFET) having a gate terminal 235a, a source terminal 240a, and a drain terminal 245a, and a pwm control signal may be provided to the gate terminal 235a to control the on/off state between source terminal 240a and the drain terminal 245a. Similarly, switch 230b may take the form of a MOSFET and be controlled through a pwm control signal. In practice, the pwm signals controlling the switches 230a and 230b may be the inverse of each other, and they may be provided by control circuitry (not shown) in response to current demanded by a load coupled to the output terminal 160. For instance, when an increased demand for current at a load coupled to output terminal 160 is sensed by the control circuitry, the control circuitry may modulate the duty cycle of the pwm control signals for switches 230a and 230b in response.

More generally, when a load transient is sensed at the output terminal 160, the duty cycles of AVR bridges 210-1 and 210-2 are changed rapidly to respond to the new load demand And after the AVR bridges 210-1 and 210-2 respond to the transient, the duty cycles for both the AVR bridges 210-1 and 210-2 are changed back toward 50% such that the DC component of the primary winding current will gradually decay to 0 A at steady state.

The AVR bridges 210-1 and 210-2 may be switched between on and off states much faster than the main stages 110-1 to 110-k can be switched between the active and inactive states. Therefore, the AVR bridges 210-1 and 210-2 can respond to transient current demand at the output terminal 160 much faster than main stages 110-1 to 110-k. In general, the frequency at which the AVR bridges 210-1 and 210-2 can be switched between the on and off states is at least ten (10) times greater than the frequency at which the main stages 110-1 to 110-k can be switched between the active and inactive states. In the embodiment of FIG. 2, the AVR bridges have a maximum switching frequency greater or equal to about 20 MHz (Fsw_avr>=20 MHz) and the main stages have a maximum switching frequency of about 2 MHz (Fsw_main=2 MHz). Through the combined use of the AVR bridges 210-1, 210-2 and the main stages 110-1 to 110-k the VR 200 realizes high bandwidth power delivery and high end-to-end power delivery efficiency.

Figure 3:
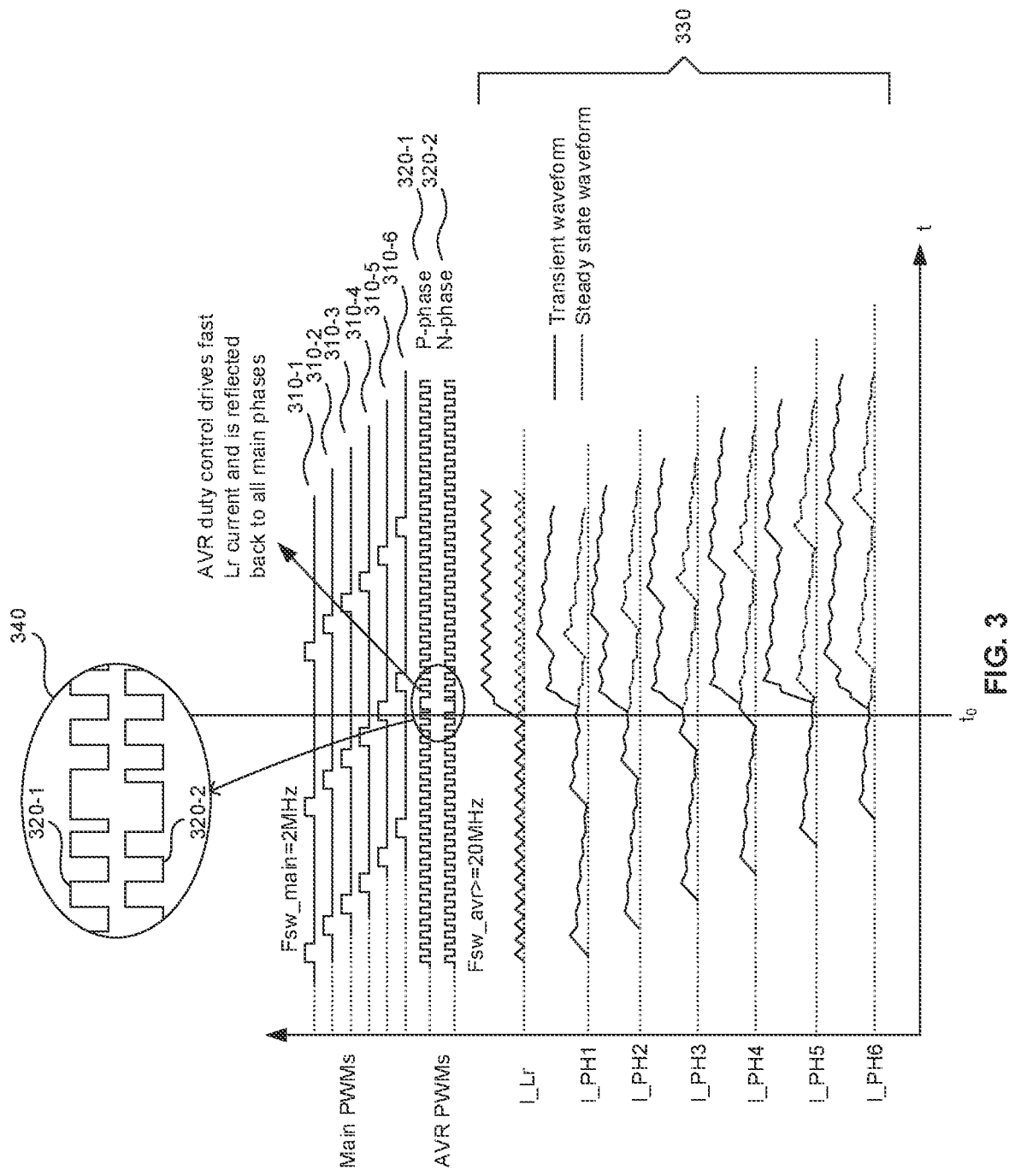
FIG. 3 shows graphs of signal levels versus time for selected signals of the FIG. 2 embodiment.

The performance characteristics of the FIG. 2 configuration are depicted in FIG. 3. FIG. 3 shows graphs of signal levels versus time for selected signals of a FIG. 2 embodiment in which k=6. As can be seen from the figure, six main pwm control signals 310-1 to 310-6 are shown. Below the main pwm control signals 310-1 to 310-6, two AVR pwm control signals 320-1 and 320-2 are shown. Below the AVR pwm currents, current generated by the AVR bridges 210-1 and 210-2 is depicted (designated by I_Lr), and currents contributed to the total current at output terminal 160 by each of main stages 110-1 to 110-6 are depicted (and designated respectively as I_PH1 to I_PH6). At time to in the figure, a load coupled to output terminal 160 suddenly requires more current, i.e., a fast load transient occurs. As depicted in detailed portion 340 of the figure, the duty cycle of the pwm control signal 320-1 for AVR bridge 210-1 is increased in response to transient, while the duty cycle of the pwm control signal 320-2 for AVR bridge 210-2 is proportionally decreased. The result is an increase in I_Lr, relative to I_Lr under steady state conditions, which is reflected in each of the contributing currents I_PH1 to IPH6.

Figure 4:
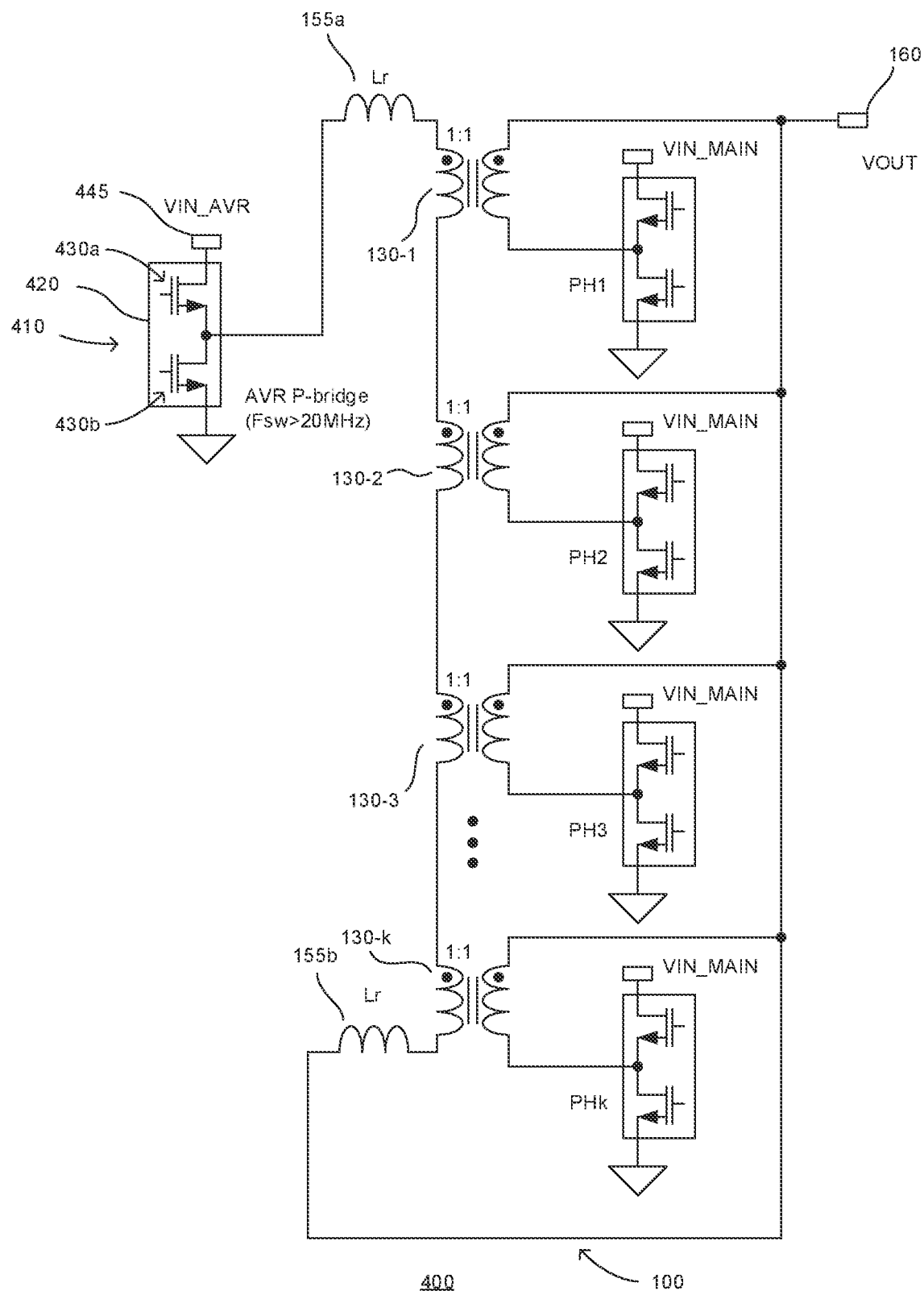
FIG. 4 is a circuit diagram of a voltage regulator of an embodiment having a single AVR bridge coupled to the primary windings of the TLVR of FIG. 1.

Turning now to FIG. 4, the figure shows a voltage regulator 400 having a single AVR bridge 410 in combination with the TLVR 100 of FIG. 1. As depicted, the AVR bridge 410 may be, for example, the same or similar to AVR bridge 210-1 and include switching circuitry 420. The switching circuitry 420 includes a first switch 430a (e.g., a MOSFET) for selectively coupling an AVR bridge input voltage 445 to the primary winding 130-1, and a second switch 430b (e.g., a MOSFET) for selectively coupling the primary winding 130-1 to ground. Also, the output terminal 160 of voltage regulator 400 is coupled to primary winding 130-k. Thus, the voltage regulator 400 requires less circuitry than the voltage regulator 200 of FIG. 2, and is less demanding from a control perspective. Nevertheless, the voltage regulator 400 has an asymmetric di/dt capability. More specifically, when the AVR bridge input voltage 445 is greater than twice the voltage at the output terminal 160, which is usually the case, voltage regulator 400 is more responsive to increases in load current at output terminal 160 than to decreases in load current at output terminal 160. Therefore, voltage regulator 400 is appropriate for use in applications where the voltage overshoot associated with decreases in load current is less of a concern.

Regarding the asymmetric di/dt capability of voltage regulator 400, it is noted that the capability is related to the current imparted to the primary windings 130-1 to 130-k by the AVR bridge 410. When the AVR bridge 410 is in an on state, there is a voltage across the primary windings 130-1 to 130-k to drive an increase in the imparted current, and such voltage is equal to the AVR bridge input voltage 445 (VIN_AVR) minus the voltage output at terminal 160 (VOUT). When the AVR bridge 410 is in an off state, there is a voltage across the primary windings 130-1 to 130-k to drive a decrease in the imparted current, and such voltage is equal to −VOUT. Thus, when VIN_AVR>2*VOUT, the magnitude of the voltage driving current increase is larger than the magnitude of the voltage driving current decrease.

Figure 5:
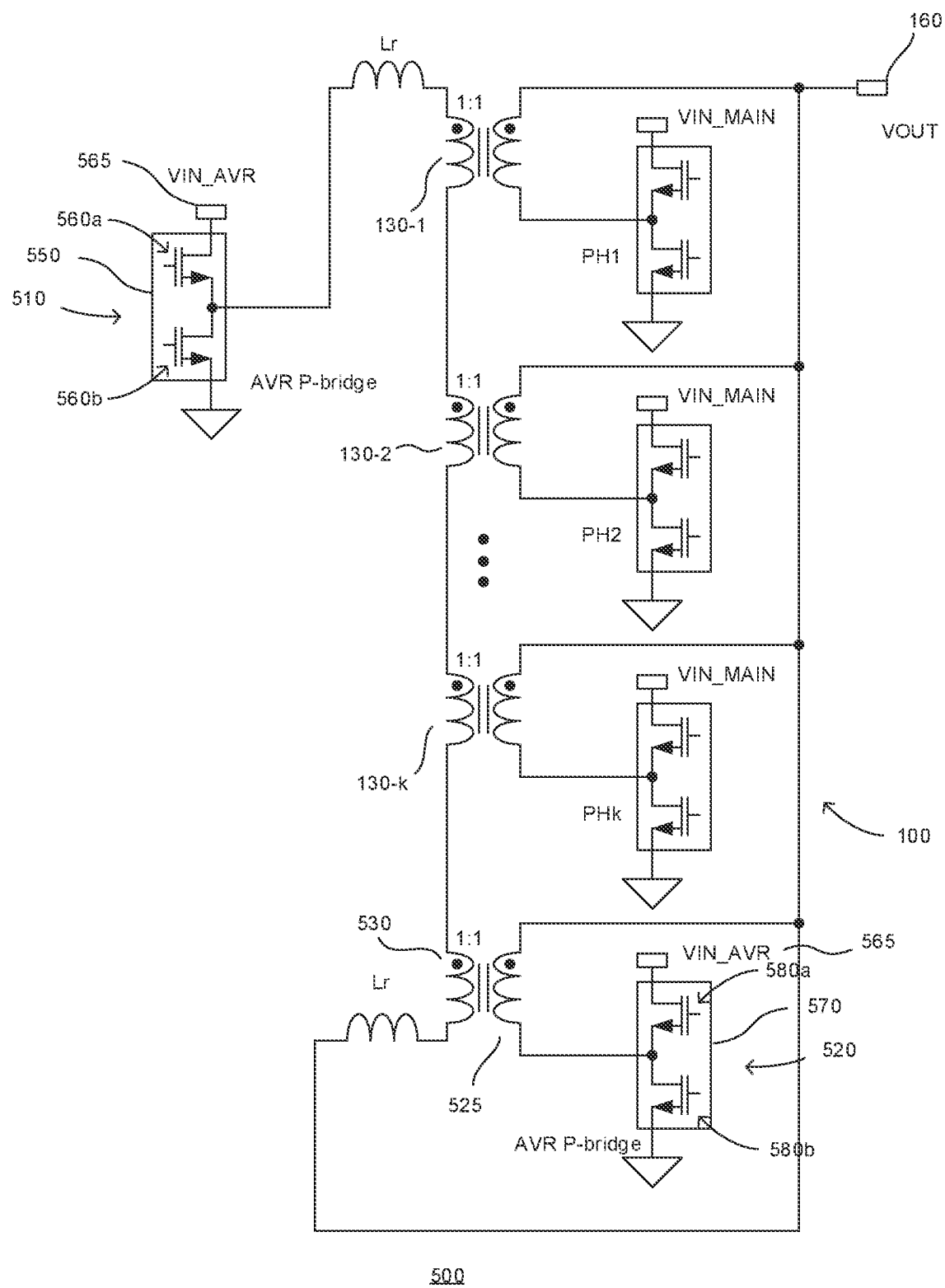
FIG. 5 is a circuit diagram of a voltage regulator of an embodiment having a first AVR bridge coupled to the primary windings of a TLVR and a second AVR bridge having a secondary winding inductively coupled to the a primary winding, with the AVR primary winding connected in series with the primary windings of the TLVR main stages.

Referring now to FIG. 5, the figure shows a voltage regulator 500 of an embodiment having a first AVR bridge 510 coupled to primary windings 130-1 to 130-k of the TLVR 100 of FIG. 1 and a second AVR bridge 520 coupled to an AVR bridge secondary winding 525 which is inductively coupled to an AVR bridge primary winding 530, with the AVR bridge primary winding 530 connected in series with the primary windings 130-1 to 130-k of the TLVR main stages 110-1 to 110-k. Also, the output terminal 160 of voltage regulator 500 is coupled to AVR bridge primary winding 530.

The AVR bridges 510 and 520 may be, for example, the same or similar to AVR bridge 210-1. AVR bridge 510 includes switching circuitry 550. The switching circuitry 550 is coupled to primary winding 130-1, and includes a first switch 560a (e.g., a MOSFET) for selectively coupling an AVR bridge input voltage 565 to the primary winding 130-1, and a second switch 560b (e.g., a MOSFET) for selectively coupling the primary winding 130-1 to ground. AVR bridge 520 includes switching circuitry 570. The switching circuitry 570 is coupled to AVR bridge secondary winding 525, and includes a first switch 580a (e.g., a MOSFET) for selectively coupling the AVR bridge input voltage 565 to the AVR bridge secondary winding 525, and a second switch 580b (e.g., a MOSFET) for selectively coupling the AVR bridge secondary winding 525 to ground.

The voltage regulator 500 can respond to load transients faster than the voltage regulator 400 of FIG. 4 because the addition of AVR bridge 520 provides an additional source of high frequency current response. Nevertheless, voltage regulator 500, like voltage regulator 400, is more responsive to increases in load current at output terminal 160 than to decreases in load current at output terminal 160. Therefore, voltage regulator 500 is appropriate for use in applications where the voltage overshoot associated with decreases in load current is less of a concern. In order to improve response to decreases in load current at output terminal 160 a third AVR bridge may be added to the configuration of FIG. 5, with the third AVR bridge having switching circuitry coupled to AVR secondary winding 525 such that the AVR secondary winding 525 is between the switching circuitry of the third AVR bridge and the switching circuitry of the AVR bridge 520 and is not coupled to output terminal 160.

It should be noted that in an alternative embodiment a voltage regulator is provided like that of FIG. 5, but without AVR bridge 510. In such embodiment, primary winding 130-1 is coupled to ground rather than to AVR bridge 510, and AVR bridge primary winding 530 is coupled to ground rather than to output terminal 160.

Figure 6:
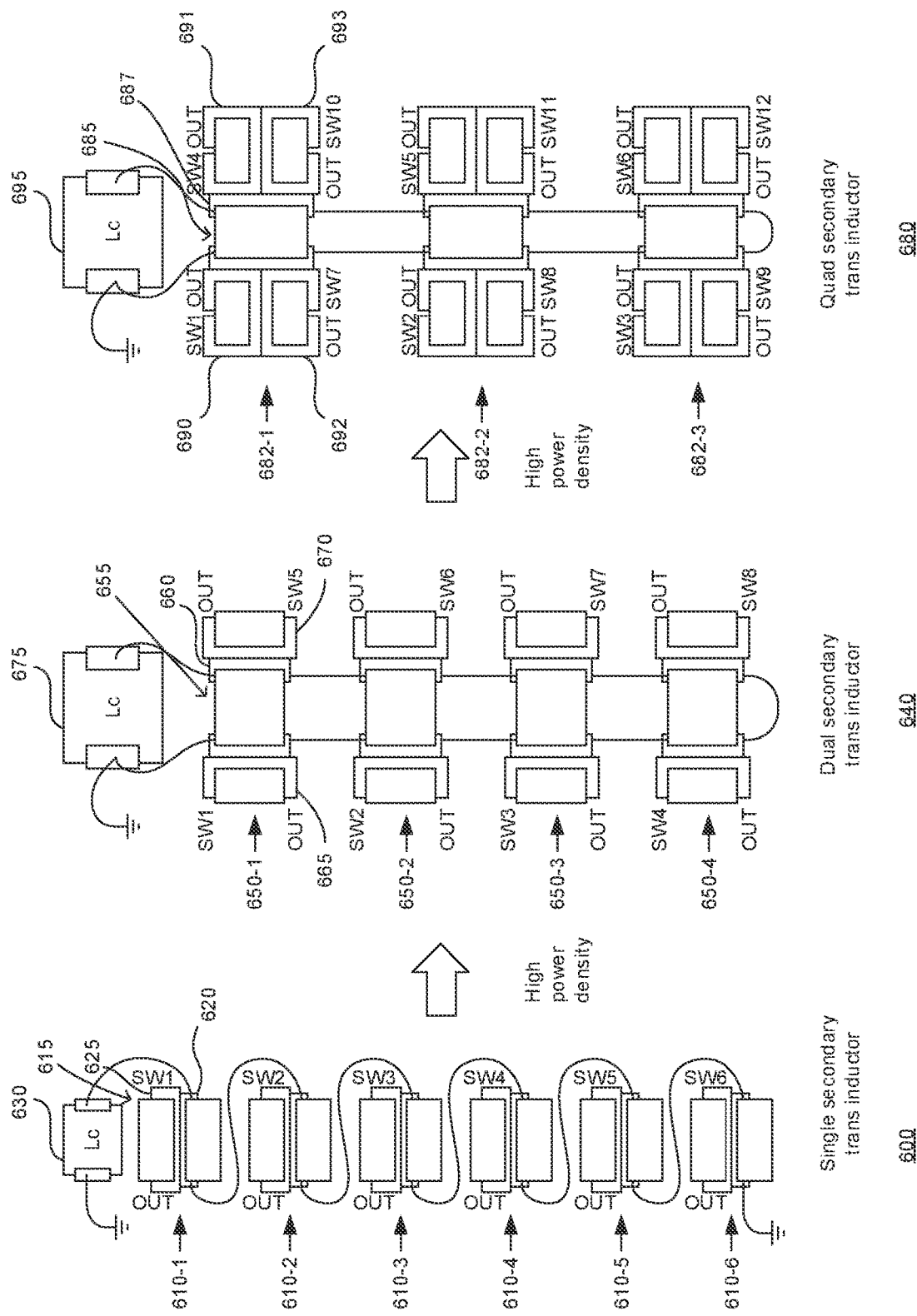
FIG. 6A is a block diagram depicting an arrangement of single secondary transformers that may be used in embodiments of FIGS. 2-5.
FIG. 6B is a block diagram depicting an arrangement of dual secondary transformers that may be used in embodiments of FIGS. 2-5.
FIG. 6C is a block diagram depicting an arrangement of quad secondary transformers that may be used in embodiments of FIGS. 2-5.

Referring now to FIGS. 6A to 6C, various transformer arrangements applicable to the embodiments of FIGS. 2-5 will be described.

FIG. 6A is a block diagram depicting an arrangement 600 of single secondary transformers that may be used in the embodiments of FIGS. 2-5. The depicted arrangement 600 includes six transformers 610-1 to 610-6, although it is noted that the embodiments are not limited to six transformers and that the six transformer arrangement is shown merely for purposes of illustration. Each of the transformers 610-1 to 610-6 includes a core, e.g., core 615 of transformer 610-1, a single primary winding, e.g., primary winding 620 of transformer 610-1, and a single secondary winding, e.g., secondary winding 625 of transformer 610-1. In addition, a compensating inductance 630 may be provided between the primary windings of the arrangement 600 and ground. The arrangement may be used in any of the embodiments of FIGS. 2-5. For example, in the FIG. 2 embodiment, with k=6, the arrangement 600 may be used without compensating inductance 630 to serve as transformer cores 150-1 to 150-6, primary windings 130-1 to 130-6, and secondary windings 140-1 to 140-6. Thus, for instance, when employed in the FIG. 2 embodiment, core 615 of arrangement 600 serves as transformer core 150-1 of voltage regulator 200, primary winding 620 of arrangement 600 serves as primary winding 130-1 of voltage regulator 200, and secondary winding 625 serves as secondary winding 140-1 of voltage regulator 200.

FIG. 6B is a block diagram depicting an arrangement 640 of dual secondary transformers that may be used in embodiments of FIGS. 2-5. The arrangement 640 allows for a higher power density than the arrangement 600 of FIG. 6A, and is therefore suitable for use in voltage regulators when space restrictions dictate. FIG. 6B shows four dual secondary transformers 650-1 to 650-4 that may be used in the embodiments of FIGS. 2-5, although it is noted that the embodiments are not limited to four transformers and that the four transformer arrangement of FIG. 6B is shown merely for purposes of illustration. Each of the transformers 650-1 to 650-4 includes a core, e.g., core 655 of transformer 650-1, a single primary winding, e.g., primary winding 660 of transformer 650-1, and two secondary windings, e.g., secondary windings 665 and 670 of transformer 650-1. In addition, a compensating inductance 675 may be provided between the primary windings of the arrangement 640 and ground. The arrangement may be used in any of the embodiments of FIGS. 2-5. For example, in the FIG. 2 embodiment, with k=8, the arrangement 640 may be used without compensating inductance 675 to serve as transformer cores 150-1 to 150-8, primary windings 130-1 to 130-8, and secondary windings 140-1 to 140-8. Thus, for instance, when employed in the FIG. 2 embodiment, core 655 of arrangement 640 serves as transformer cores 150-1 and 150-2 of voltage regulator 200, primary winding 660 of arrangement 640 serves as primary windings 130-1 and 130-5 of voltage regulator 200, and secondary windings 665 and 670 respectively serve as secondary windings 140-1 and 140-5 of voltage regulator 200.

FIG. 6C is a block diagram depicting an arrangement 680 of quad secondary transformers that may be used in embodiments of FIGS. 2-5. The arrangement 680 allows for a higher power density than the arrangements 600 and 640 of FIGS. 6A and 6B and is therefore suitable for use in voltage regulators when space restrictions dictate. FIG. 6C shows three quad secondary transformers 682-1, 682-1, and 682-3 that may be used in the embodiments of FIGS. 2-5, although it is noted that the embodiments are not limited to three transformers and that the three transformer arrangement of FIG. 6C is shown merely for purposes of illustration. Each of the transformers 682-1 to 682-3 includes a core, e.g., core 685 of transformer 682-1, a single primary winding, e.g., primary winding 687 of transformer 682-1, and four secondary windings, e.g., secondary windings 690 to 693 of transformer 682-1. In addition, a compensating inductance 695 may be provided between the primary windings of the arrangement 680 and ground. The arrangement may be used in any of the embodiments of FIGS. 2-5. For example, in the FIG. 2 embodiment, with k=12, the arrangement 680 may be used without compensating inductance 695 to serve as transformer cores 150-1 to 150-12, primary windings 130-1 to 130-12, and secondary windings 140-1 to 140-12. Thus, for instance, when employed in the FIG. 2 embodiment, core 685 of arrangement 640 serves as transformer cores 150-1, 150-4, 150-7, and 150-10 of voltage regulator 200, primary winding 687 of arrangement 680 serves as primary windings 130-1, 130-4, 130-7, and 130-10 of voltage regulator 200, and secondary windings 690, 691, 692, and 693 respectively serve as secondary windings 140-1, 140-4, 140-7, and 140-10 of voltage regulator 200.

Figure 7:
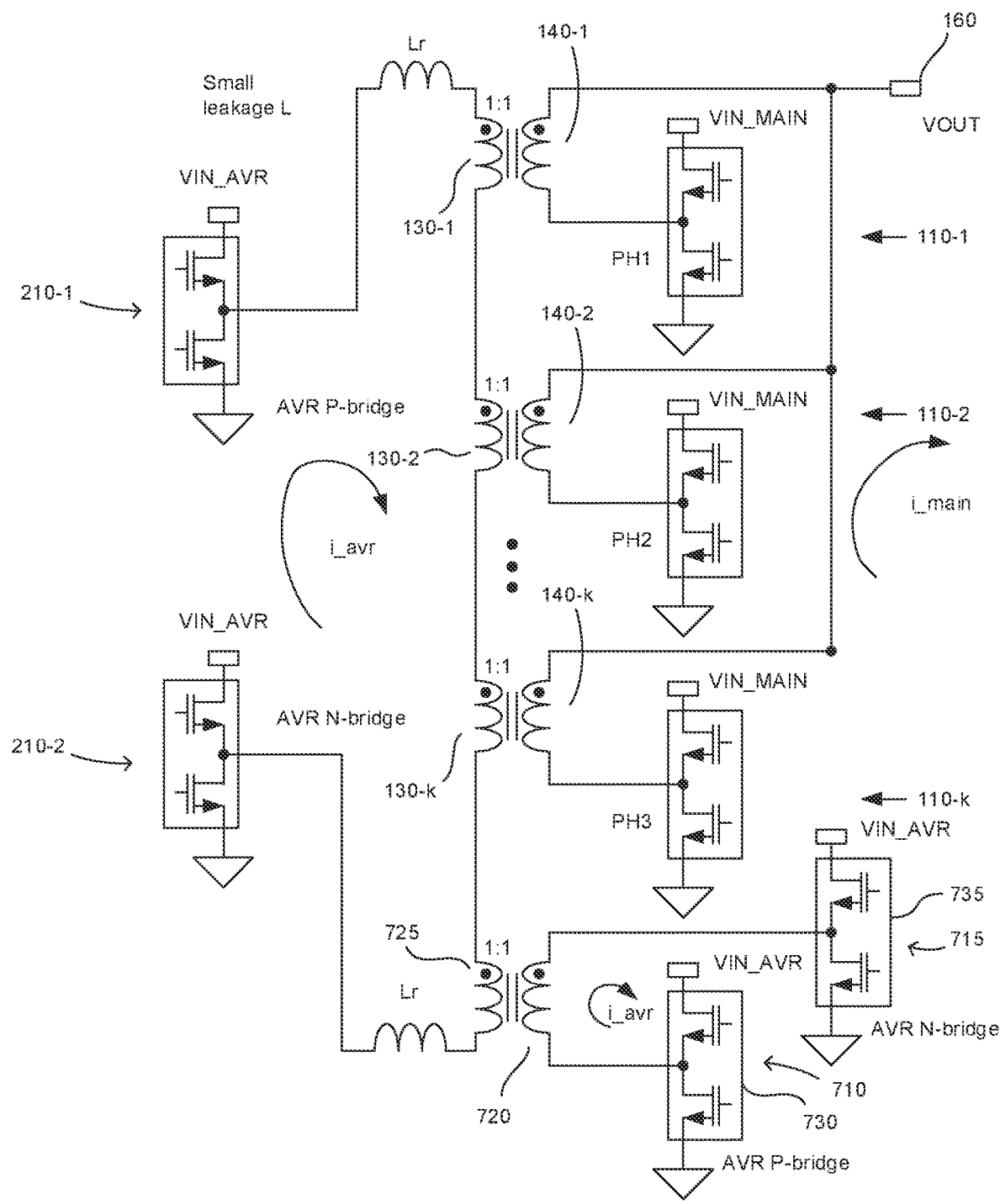
FIG. 7 is a circuit diagram of a voltage regulator of an embodiment having a configuration similar to that of FIG. 2 but including additional elements.

In each of the arrangements of FIGS. 6A-6C, the compensating inductance (e.g., compensating inductance 630) is an optional physical component that may be added to the arrangement when the natural leakage inductance (e.g., leakage inductance 155a and 155b) is insufficient for application in a VR embodiment. Nevertheless, in most of the VR embodiments, a compensating inductance is not required Turning now to FIG. 7, the figure shows a voltage regulator 700 of an embodiment having a configuration similar to that of the VR 200 of FIG. 2 but including a third AVR bridge 710, a fourth AVR bridge 715, an AVR bridge secondary winding 720, and an AVR bridge primary winding 725. The third and fourth AVR bridges 710 and 715 may be, for example, the same or similar to the first AVR bridge 210-1. As can be seen from the figure, the third AVR bridge 710 has switching circuitry 730 coupled to the AVR bridge secondary winding 720, and the second AVR bridge 715 has switching circuitry 735 coupled to the AVR bridge secondary winding 720. In addition, the AVR bridge primary winding 725 forms a series connection with the primary windings 130-1 to 130-*k*, the first AVR bridge 210-1 is coupled to the primary winding 130-1, and the second AVR bridge 210-2 is coupled to the AVR bridge primary winding 725. The voltage regulator 700 has enhanced di/dt response capability relative to voltage regulator 200 due to the added elements.

Figure 8:
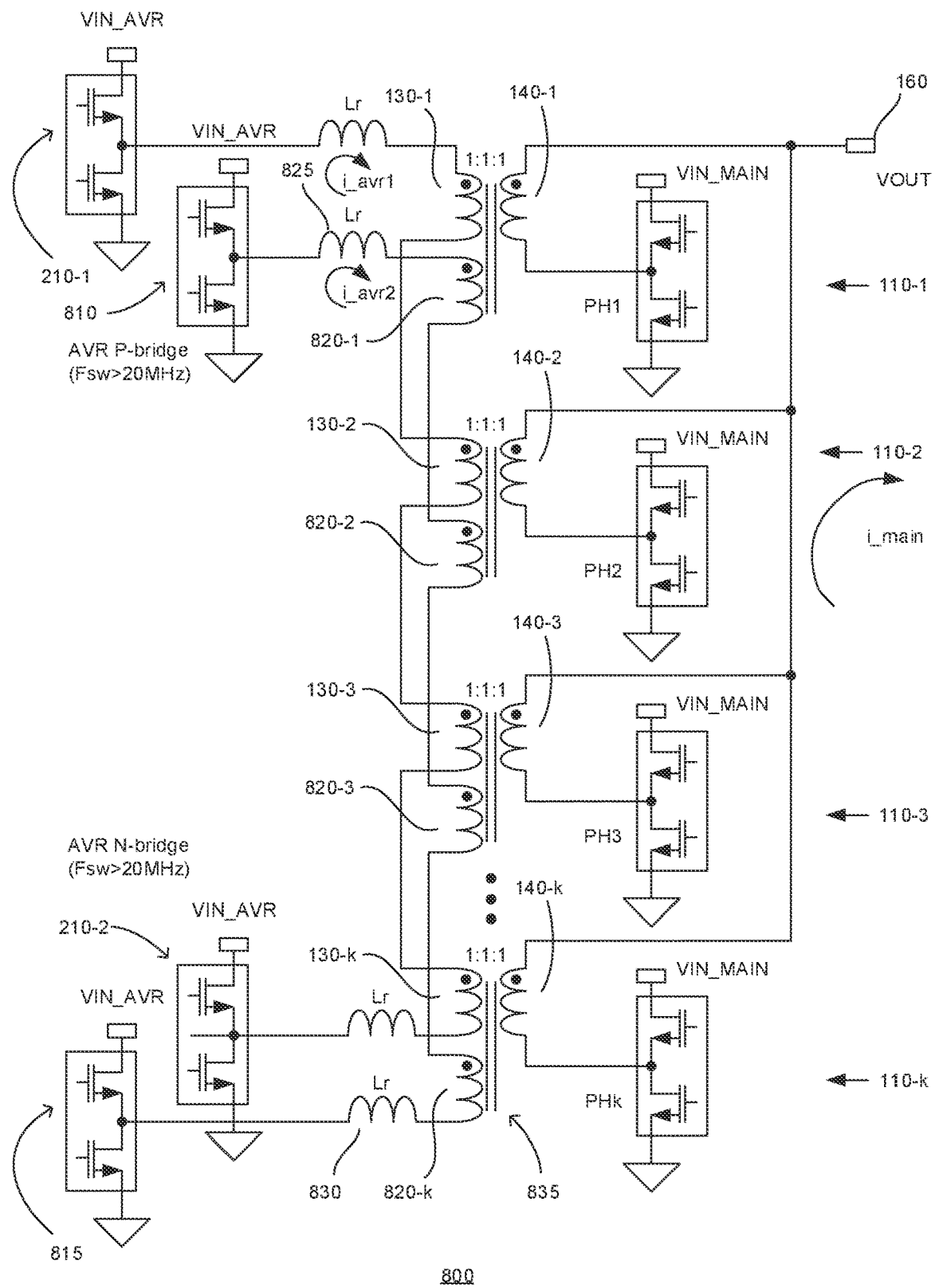
FIG. 8 is a circuit diagram of a voltage regulator of another embodiment having a configuration similar to that of FIG. 2 but including additional elements.

Referring to FIG. 8, the figure shows a voltage regulator 800 of an embodiment having a configuration similar to that of the VR 200 of FIG. 2 but including a third AVR bridge 810, a fourth AVR bridge 815, and additional primary windings 820-1, 820-2, 820-3 . . . 820-*k*. The third and fourth AVR bridges 810 and 815 may be, for example, the same or similar to that of the first AVR bridge 210-1. The additional primary windings 820-1 to 820-*k* are connected in series with each other, are inductively coupled to secondary windings 140-1 to 140-*k*, respectively, and are associated with leakage inductance, which is represented in the figure by a first leakage inductance 825 and a second leakage inductance 830. Further, as can be seen from the figure, the primary windings 130-1 to 130-*k* and the additional primary windings 820-1 to 820-*k* may be inductively coupled to the secondary windings 140-1 to 140-*k* through an arrangement of dual primary transformers 835. Since VR 800 employs a greater number of AVR bridges than VR 200, VR 800 may use AVR bridges each having a reduced current rating relative to the AVR bridges of VR 200 while still matching or exceeding the transient performance of VR 200.

Embodiments of the present technology include, but are not restricted to, the following.

(1) A voltage regulator including a plurality of main stages, each main stage having first switching circuitry, a primary winding, and a secondary winding inductively coupled to the primary winding, the first switching circuitry configured to selectively couple a main input voltage to the secondary winding at a main stage switching frequency, and the secondary winding coupled between the switching circuitry and an output terminal, wherein the primary windings of the main stages are connected in series to form a series connection having a first end and a second end; and at least one accelerated voltage regulator (AVR) bridge having second switching circuitry, each AVR bridge coupled to one of the first end or the second end of the series connection, and the second switching circuitry configured to selectively couple an AVR bridge input voltage to the series connection at an AVR bridge switching frequency, wherein the AVR bridge switching frequency is at least ten times greater than the main stage switching frequency.

(2) The voltage regulator according to (1), wherein the AVR bridge switching frequency is greater than or equal to 20 MHz.

(3) The voltage regulator according to (1), wherein the second switching circuitry includes a first switch between a source of the AVR bridge input voltage and the series connection, and a second switch between the series connection and ground.

(4) The voltage regulator according to (3), wherein the first switch includes a metal-oxide-semiconductor field-effect transistor (MOSFET), and the second switch includes a MOSFET.

(5) The voltage regulator according to (1), wherein the at least one AVR bridge includes two AVR bridges, a first AVR bridge coupled to the first end of the series connection, and a second AVR bridge coupled to the second end of the series connection.

(6) The voltage regulator according to (5), wherein the AVR bridge switching frequency is greater than or equal to 20 MHz.

(7) The voltage regulator according to (5), wherein the second switching circuitry includes a first switch between a source of the AVR bridge input voltage and the series connection, and a second switch between the series connection and ground.

(8) The voltage regulator according to (7), wherein the first switch includes a MOSFET, and the second switch includes a MOSFET.

(9) The voltage regulator according to (1), wherein the primary windings and the secondary windings are arranged in the form of multiple-secondary transformers.

(10) A voltage regulator including a plurality of main stages, each main stage having first switching circuitry, a main stage primary winding, and a main stage secondary winding inductively coupled to the main stage primary winding, the first switching circuitry configured to selectively couple a main input voltage to the main stage secondary winding at a main stage switching frequency, and the main stage secondary winding coupled between the first switching circuitry and an output terminal; and at least one accelerated voltage regulator (AVR) bridge, each AVR bridge having second switching circuitry, and being coupled to an AVR bridge secondary winding which is inductively coupled to an AVR bridge primary winding, the second switching circuitry configured to selectively couple an AVR bridge input voltage to the AVR bridge secondary winding at an AVR bridge switching frequency, and the AVR bridge secondary winding being coupled between the second switching circuitry and the output terminal or between a first one of the at least one AVR bridge and a second one of the at least one AVR bridge, wherein the main stage primary windings and the AVR bridge primary winding are connected in series to form a series connection having a first end and a second end, and wherein the AVR bridge switching frequency is at least ten times greater than the main stage switching frequency.

(11) The voltage regulator according to (10), wherein the AVR bridge switching frequency is greater than or equal to 20 MHz.

(12) The voltage regulator according to (10), wherein the second switching circuitry includes a first switch between a source of the AVR bridge input voltage and the AVR bridge secondary winding, and a second switch between the AVR bridge secondary winding and ground.

(13) The voltage regulator according to (12), wherein the first switch includes a metal-oxide-semiconductor field-effect transistor (MOSFET), and the second switch includes a MOSFET.

(14) The voltage regulator according to (10), further including at least one other AVR bridge having other second switching circuitry, the other AVR bridge coupled to one of the first end or the second end of the series connection, and the other second switching circuitry configured to selectively couple the AVR bridge input voltage to the series connection at the AVR bridge switching frequency.

(15) The voltage regulator according to (14), wherein the AVR bridge switching frequency is greater than or equal to 20 MHz.

(16) The voltage regulator according to (14), wherein the other second switching circuitry includes a first switch between a source of the AVR bridge input voltage and the series connection, and a second switch between the series connection and ground.

(17) The voltage regulator according to (16), wherein the first switch includes a metal-oxide-semiconductor field-effect transistor MOSFET, and the second switch includes a MOSFET.

(18) The voltage regulator according to (10), wherein the main stage primary windings, the AVR bridge primary windings, the main stage secondary windings, and AVR bridge secondary windings are arranged in the form of multiple-secondary transformers.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A voltage regulator comprising:
a plurality of main stages, each main stage comprising first switching circuitry, a primary winding, and a secondary winding inductively coupled to the primary winding, the first switching circuitry configured to selectively couple a main input voltage to the secondary winding at a main stage switching frequency, and the secondary winding coupled between the first switching circuitry and an output terminal, wherein the primary windings of the main stages are connected in series to form a series connection having a first end and a second end; and
at least one accelerated voltage regulator (A V R) bridge comprising second switching circuitry, each AVR bridge coupled to one of the first end or the second end of the series connection, and the second switching circuitry configured to selectively couple an AVR bridge input voltage to the series connection at an AVR bridge switching frequency,
wherein the AVR bridge switching frequency is at least ten times greater than the main stage switching frequency,
wherein the at least one AVR bridge is switched on and off at a duty cycle that is adjustable around 50% while the voltage regulator is in a steady state such that a direct current (DC) component of current generated by the at least one AVR in the primary windings is substantially zero in the steady state, and
wherein the at least one AVR bridge responds to high frequency current transients without regulating a DC output voltage of the voltage regulator, the at least one AVR bridge has a transient frequency response range that overlaps with a transient frequency response range of the main stages, and a lowest transient frequency to which the at least one AVR bridge responds is lower than a highest transient frequency to which the main stages respond.

2. The voltage regulator according to claim 1, wherein the AVR bridge switching frequency is greater than or equal to 20 MHz.

3. The voltage regulator according to claim 1, wherein the second switching circuitry comprises a first switch between a source of the AVR bridge input voltage and the series connection, and a second switch between the series connection and ground.

4. The voltage regulator according to claim 3, wherein the first switch comprises a metal-oxide-semiconductor field-effect transistor (MOSFET), and the second switch comprises a MOSFET.

5. The voltage regulator according to claim 1, wherein the at least one AVR bridge comprises two AVR bridges, a first AVR bridge coupled to the first end of the series connection, and a second AVR bridge coupled to the second end of the series connection.

6. The voltage regulator according to claim 5, wherein the AVR bridge switching frequency is greater than or equal to 20 MHz.

7. The voltage regulator according to claim 5, wherein the second switching circuitry comprises a first switch between a source of the AVR bridge input voltage and the series connection, and a second switch between the series connection and ground.

8. The voltage regulator according to claim 7, wherein the first switch comprises a MOSFET, and the second switch comprises a MOSFET.

9. The voltage regulator according to claim 1, wherein the primary windings and the secondary windings are arranged in the form of multiple-secondary transformers.

10. A voltage regulator comprising:
a plurality of main stages, each main stage comprising first switching circuitry, a main stage primary winding, and a main stage secondary winding inductively coupled to the main stage primary winding, the first switching circuitry configured to selectively couple a main input voltage to the main stage secondary winding at a main stage switching frequency, and the main stage secondary winding coupled between the first switching circuitry and an output terminal; and
at least one accelerated voltage regulator (AVR) bridge, each AVR bridge comprising second switching circuitry, and being coupled to an AVR bridge secondary winding which is inductively coupled to an AVR bridge primary winding, the second switching circuitry configured to selectively couple an AVR bridge input voltage to the AVR bridge secondary winding at an AVR bridge switching frequency, and the AVR bridge secondary winding being coupled between the second switching circuitry and the output terminal or between a first one of the at least one AVR bridge and a second one of the at least one AVR bridge,
wherein the main stage primary windings and the AVR bridge primary winding are connected in series to form a series connection having a first end and a second end,
wherein the AVR bridge switching frequency is at least ten times greater than the main stage switching frequency,
wherein the at least one AVR bridge is switched on and off at a duty cycle that is adjustable around 50% while the voltage regulator is in a steady state such that a direct current (DC) component of current generated by the at least one AVR in the primary windings is substantially zero in the steady state, and
wherein the at least one AVR bridge responds to high frequency current transients without regulating a DC output voltage of the voltage regulator, the at least one AVR bridge has a transient frequency response range that overlaps with a transient frequency response range of the main stages, and a lowest transient frequency to which the at least one AVR bridge responds is lower than a highest transient frequency to which the main stages respond.

11. The voltage regulator according to claim 10, wherein the AVR bridge switching frequency is greater than or equal to 20 MHz.

12. The voltage regulator according to claim 10, wherein the second switching circuitry comprises a first switch between a source of the AVR bridge input voltage and the AVR bridge secondary winding, and a second switch between the AVR bridge secondary winding and ground.

13. The voltage regulator according to claim 12, wherein the first switch comprises a metal-oxide-semiconductor field-effect transistor (MOSFET), and the second switch comprises a MOSFET.

14. The voltage regulator according to claim 10, further comprising at least one other AVR bridge comprising other second switching circuitry, the other AVR bridge coupled to one of the first end or the second end of the series connection, and the other second switching circuitry configured to selectively couple the AVR bridge input voltage to the series connection at the AVR bridge switching frequency.

15. The voltage regulator according to claim 14, wherein the AVR bridge switching frequency is greater than or equal to 20 MHz.

16. The voltage regulator according to claim 14, wherein the other second switching circuitry comprises a first switch between a source of the AVR bridge input voltage and the series connection, and a second switch between the series connection and ground.

17. The voltage regulator according to claim 16, wherein the first switch comprises a metal-oxide-semiconductor field-effect transistor MOSFET, and the second switch comprises a MOSFET.

18. The voltage regulator according to claim 10, wherein the main stage primary windings, the AVR bridge primary windings, the main stage secondary windings, and AVR bridge secondary windings are arranged in the form of multiple-secondary transformers.

* * * * *